(12) United States Patent
Tsukamoto et al.

(10) Patent No.: US 10,647,850 B2
(45) Date of Patent: May 12, 2020

(54) CARBODIIMIDE-BASED AQUEOUS RESIN CROSSLINKING AGENT

(71) Applicant: NISSHINBO CHEMICAL INC., Tokyo (JP)

(72) Inventors: Nami Tsukamoto, Chiba (JP); Nobuyuki Matsumoto, Chiba (JP); Ikuo Takahashi, Ichihara (JP); Takahiko Itoh, Chiba (JP)

(73) Assignee: NISSHINBO CHEMICAL INC., Tokyo (JP)

( * ) Notice: Subject to any disclaimer, the term of this patent is extended or adjusted under 35 U.S.C. 154(b) by 136 days.

(21) Appl. No.: 15/739,843

(22) PCT Filed: Jul. 6, 2016

(86) PCT No.: PCT/JP2016/069963
§ 371 (c)(1),
(2) Date: Dec. 26, 2017

(87) PCT Pub. No.: WO2017/006950
PCT Pub. Date: Jan. 12, 2017

(65) Prior Publication Data
US 2018/0371237 A1    Dec. 27, 2018

(30) Foreign Application Priority Data

Jul. 8, 2015    (JP) .................. 2015-136945

(51) Int. Cl.
| C08L 75/02 | (2006.01) |
| C08G 18/28 | (2006.01) |
| C08G 18/09 | (2006.01) |
| C08G 18/79 | (2006.01) |
| C08G 18/02 | (2006.01) |
| C08G 18/75 | (2006.01) |
| C08L 33/06 | (2006.01) |
| C08L 75/04 | (2006.01) |

(52) U.S. Cl.
CPC ............ C08L 75/02 (2013.01); C08G 18/025 (2013.01); C08G 18/09 (2013.01); C08G 18/095 (2013.01); C08G 18/283 (2013.01); C08G 18/751 (2013.01); C08G 18/797 (2013.01); C08L 33/06 (2013.01); C08L 75/04 (2013.01); *C08L 2201/54* (2013.01); *C08L 2312/00* (2013.01)

(58) Field of Classification Search
CPC ....... C08L 75/02; C08G 18/09; C08G 18/751; C08G 18/283; C08G 18/095; C08G 18/797; C80G 18/025
See application file for complete search history.

(56) References Cited

U.S. PATENT DOCUMENTS

| 5,008,363 | A | 4/1991 | Mallon et al. |
| 5,081,173 | A | 1/1992 | Taylor |
| 5,597,942 | A * | 1/1997 | Pohl ..................... C08G 18/025 521/170 |
| 5,688,875 | A | 11/1997 | Sasaki et al. |
| 6,121,406 | A | 9/2000 | Imashiro et al. |
| 2005/0032947 | A1 * | 2/2005 | Takahashi ............... C08L 67/00 524/195 |
| 2006/0106189 | A1 | 5/2006 | Hesselmans et al. |
| 2011/0015072 | A1 | 1/2011 | Hechavarria Fonseca et al. |
| 2011/0021679 | A1 | 1/2011 | Takahashi et al. |
| 2012/0264968 | A1 | 10/2012 | Yanagisawa et al. |
| 2013/0143458 | A1 | 6/2013 | Avtomonov et al. |

FOREIGN PATENT DOCUMENTS

| JP | 7-330849 A | 12/1995 |
| JP | 2000-007642 A | 1/2000 |
| JP | 2000-119539 A | 4/2000 |
| JP | 2000-319351 A | 11/2000 |
| JP | 2007-521360 A | 8/2007 |
| JP | 2011-514841 A | 5/2011 |
| JP | 2013-112755 A | 6/2013 |
| JP | 2013-523928 | 6/2013 |
| WO | WO 2009/119389 A1 | 10/2009 |
| WO | WO 2011/078331 A1 | 6/2011 |

OTHER PUBLICATIONS

International Search Report (PCT/ISA/210) issued in PCT/JP2016/069963, dated Oct. 11, 2016.
Extended European Search Report, dated Jan. 16, 2019, for European Application No. 16821419.5.

* cited by examiner

*Primary Examiner* — John E Uselding
(74) *Attorney, Agent, or Firm* — Birch, Stewart, Kolasch & Birch, LLP

(57) ABSTRACT

A carbodiimide-based aqueous resin crosslinking agent excellent in the storage stability in the coexistence of an aqueous resin, comprising a polycarbodiimide (A) having substituents derived from hydrophilic organic compounds at both terminals thereof, at least one of the substituents being a substituent derived from a hydrophilic organic compound having a molecular weight of 340 or more, and a polycarbodiimide (B) having substituents derived from organic compounds having a molecular weight of 300 or less at both terminals thereof, wherein the mass ratio [(B)/(A)] of the polycarbodiimide (B) to the polycarbodiimide (A) is from 20/80 to 95/5.

11 Claims, No Drawings

CARBODIIMIDE-BASED AQUEOUS RESIN CROSSLINKING AGENT

TECHNICAL FIELD

The present invention relates to a carbodiimide-based aqueous resin crosslinking agent, a carbodiimide-based aqueous resin crosslinking agent-containing liquid comprising the carbodiimide-based aqueous resin crosslinking agent and a production method thereof, and an aqueous resin composition comprising the carbodiimide-based aqueous resin crosslinking agent.

BACKGROUND ART

An aqueous resin is used in various fields including paints, inks, fiber treating agents, adhesives, coating agents and the like, but is inferior in water resistance to an oily resin as it is aqueous. Therefore, in order to enhance the water resistance of the aqueous resin, a method using an aqueous resin crosslinking agent has been conventionally employed, and compounds having a carbodiimide group, a methylol group, an ethyleneimine group, an epoxy group, an isocyanate group or the like are used as the aqueous resin crosslinking agent.

Among them, the carbodiimide-based aqueous resin crosslinking agent having a carbodiimide group is advantageous in that it can react with the functional group (for example, a carboxyl group) contained in the aqueous resin at a low temperature to enhance the properties such as strength, water resistance and adhesion of the coating film formed from the aqueous resin.

However, when such a carbodiimide-based aqueous resin crosslinking agent is added to the aqueous resin, the carbodiimide group in the crosslinking agent reacts with the carboxyl group in the aqueous resin and an aqueous medium such as water with time, leading to gradual gelation and insufficient crosslinking, and it is thus necessary to perform a crosslinking reaction, for example by heating, immediately after the addition of the crosslinking agent.

In recent years, it is desired to store, transport and market the mixture of a carbodiimide-based aqueous resin crosslinking agent and an aqueous resin. Therefore, there is a need for carbodiimide-based aqueous resin crosslinking agents excellent in the storage stability that can perform the crosslinking reaction sufficiently even after mixture of the carbodiimide-based aqueous resin crosslinking agents and the aqueous resin and storage for a long period of time.

As such a carbodiimide-based aqueous resin crosslinking agent, PTL1 describes aqueous dicyclohexylmethanecarbodiimide having a specific structure. PTL2 describes a method of producing a carbodiimide-based aqueous resin crosslinking agent comprising dispersing a mixture of a particular compound having a carbodiimide group and a particular radically polymerizable unsaturated monomer in water with a surfactant to give a dispersed particle and then polymerizing the radically polymerizable unsaturated monomer.

PTL3 describes, as a carbodiimide-based aqueous resin crosslinking agent, a hydrophilic polycarbodiimide compound having a lipophilic molecular chain attached at one terminal of a molecular chain having a carbodiimide group and having a hydrophilic molecular chain attached at the other terminal thereof. PTL4 describes a water-soluble or water-dispersible modified polycarbodiimide amine obtained by modifying, a polycarbodiimide derived from an aromatic diisocyanate compound having its terminal blocked with a hydrophilic compound, with a secondary amine.

PTL5 discloses a method of producing a microcapsule having a capsule wall and a capsule core, and also discloses a resin crosslinking agent the storage stability of which is enhanced by using a crosslinking agent as the capsule core.

CITATION LIST

Patent Literature

PTL1: JP 2000-7642 A
PTL2: JP 2000-119539 A
PTL3: JP 2000-319351 A
PTL4: JP 2013-112755 A
PTL5: JP 2011-514841 A

SUMMARY OF INVENTION

Technical Problem

The carbodiimide-based aqueous resin crosslinking agent described in PTLs1 to 4 is superior in the storage stability to conventional ones but is desired be further improved. The microcapsule-type resin crosslinking agent described in PTL5 is excellent in the storage stability, but cannot be produced in a simple way and is difficult to produce at low cost. Therefore, there is a need for the development of the carbodiimide-based aqueous resin crosslinking agent improved in the above-mentioned disadvantages.

The present invention has been made in view of the above conventional problems. Accordingly, an object to the present invention is to provide a carbodiimide-based aqueous resin crosslinking agent excellent in the storage stability in the coexistence of an aqueous resin, a carbodiimide-based aqueous resin crosslinking agent-containing liquid containing the carbodiimide-based aqueous resin crosslinking agent and a production method thereof, and an aqueous resin composition containing the carbodiimide-based aqueous resin crosslinking agent.

Solution to Problem

As a result of earnest investigations made for solving the above conventional problems, the inventors have found that the presence of particular two types of polycarbodiimides in a particular ratio in an aqueous medium allows an aqueous resin to be crosslinked even after the dispersion of polycarbodiimides has coexisted with the aqueous resin for a long period of time, and have thus completed the present invention.

The summary of the present invention is as follows:

[1] A carbodiimide-based aqueous resin crosslinking agent comprising a polycarbodiimide (A) having substituents derived from hydrophilic organic compounds at both terminals thereof, at least one of the substituents being a substituent derived from a hydrophilic organic compound having a molecular weight of 340 or more, and a polycarbodiimide (B) having substituents derived from organic compounds having a molecular weight of 300 or less at both terminals thereof, wherein the mass ratio [(B)/(A)] of the polycarbodiimide (B) to the polycarbodiimide (A) is from 20/80 to 95/5.

[2] The carbodiimide-based aqueous resin crosslinking agent according to the item [1], wherein the hydrophilic organic compound having a molecular weight of 340 or more is a polyalkylene oxide end-capped with an alkoxy group or a phenoxy group, represented by the following formula (a1);

wherein $R^1$ represents an alkyl group having 1 to 4 carbon atoms or a phenyl group; $R^2$ represents a hydrogen atom or a methyl group; and m is an integer of 7 to 30.

[3] The carbodiimide-based aqueous resin crosslinking agent according to the item [2], wherein $R^1$ is a methyl group and $R^2$ is a hydrogen atom.

[4] The carbodiimide-based aqueous resin crosslinking agent according to any one of the items [1] to [3], wherein the organic compound having a molecular weight of 300 or less is a compound having an active hydrogen reactive with an isocyanate group or a compound having an isocyanate group.

[5] The carbodiimide-based aqueous resin crosslinking agent according to the item [4], wherein the compound having an active hydrogen reactive with an isocyanate group is one or more monoamines having an aliphatic hydrocarbon group having 1 to 18 carbon atoms or an alicyclic hydrocarbon group having 3 to 18 carbon atoms, and the compound having an isocyanate group is one or more monoisocyanates having an aliphatic hydrocarbon group having 1 to 18 carbon atoms or an alicyclic hydrocarbon group having 3 to 18 carbon atoms.

[6] The carbodiimide-based aqueous resin crosslinking agent according to the item [4] or [5], wherein the compound having an active hydrogen reactive with an isocyanate group is cyclohexylamine, and the compound having an isocyanate group is cyclohexyl isocyanate.

[7] A carbodiimide-based aqueous resin crosslinking agent-containing liquid, comprising the carbodiimide-based aqueous resin crosslinking agent according to any one of the items [1] to [6] and an aqueous medium.

[8] The carbodiimide-based aqueous resin crosslinking agent-containing liquid according to the item [7], further comprising a surfactant.

[9] The carbodiimide-based aqueous resin crosslinking agent-containing liquid according to the item [7] or [8], wherein the aqueous medium is water.

[10] A method of producing the carbodiimide-based aqueous resin crosslinking agent-containing liquid according to any one of the items [7] to [9], comprising a step of mixing the polycarbodiimide (A) and the polycarbodiimide (B) to prepare a mixed liquid; and a step of mixing the mixed liquid and the aqueous medium.

[11] An aqueous resin composition comprising the carbodiimide-based aqueous resin crosslinking agent according to any one of the items [1] to [6] and an aqueous resin.

Advantageous Effects of Invention

According to the present invention, it is possible to provide a carbodiimide-based aqueous resin crosslinking agent excellent in the storage stability in the coexistence of an aqueous resin, a carbodiimide-based aqueous resin crosslinking agent-containing liquid containing the carbodiimide-based aqueous resin crosslinking agent and a production method thereof, and an aqueous resin composition containing the carbodiimide-based aqueous resin crosslinking agent.

DESCRIPTION OF EMBODIMENTS

Carbodiimide-Based Aqueous Resin Crosslinking Agent

The carbodiimide-based aqueous resin crosslinking agent of the present invention is a carbodiimide-based aqueous resin crosslinking agent comprising a polycarbodiimide (A) having substituents derived from hydrophilic organic compounds at both terminals thereof, at least one of the substituents being a substituent derived from a hydrophilic organic compound having a molecular weight of 340 or more, and a polycarbodiimide (B) having substituents derived from organic compounds having a molecular weight of 300 or less at both terminals thereof, wherein the mass ratio [(B)/(A)] of the polycarbodiimide (B) to the polycarbodiimide (A) is from 20/80 to 95/5.

Polycarbodiimide (A)

The polycarbodiimide (A) is a polycarbodiimide having substituents derived from hydrophilic organic compounds at both terminals thereof, at least one of the substituents being a substituent derived from a hydrophilic organic compound having a molecular weight of 340 or more.

The polycarbodiimide (A) in the present invention is obtained, for example, by reacting an isocyanate-terminated polycarbodiimide with a particular hydrophilic organic compound reactive with the isocyanate.

Hydrophilic Organic Compound

The hydrophilic organic compounds as used herein refers to monoalcohols, monoamines and monocarboxylic acids that have a substituent having an active hydrogen reactive with the isocyanate group present at the terminal of the polycarbodiimide and further have one or more heteroatoms in their molecules.

Specific examples of the hydrophilic organic compound include monoalcohols, monoamines and monocarboxylic acids that have, in their molecule, one substituent selected from the group consisting of a hydroxyl group, a primary amino group, a secondary amino group, an imino group, an isocyanate group and a carboxyl group and further have one or more heteroatoms in their molecules in addition to the substituents. Among them, monoalcohols or monoamines that have one substituent selected from the group consisting of a hydroxyl group, a primary amino group, a secondary amino group and an imino group at the terminal of their molecular chains and further have one or more heteroatoms in their molecules in addition to the substituents are preferred.

Examples of the monoalcohols or monoamines include poly(oxyalkylene) monoalkyl ether and monohydroxy polyester having one or more substituents selected from the group consisting of an aliphatic hydrocarbon group, an alicyclic hydrocarbon group and an aromatic hydrocarbon group. The monoalcohols or monoamines may have one or more groups selected from the group consisting of an anionic group, a cationic group, a nonionic-anionic group and a nonionic-cationic group.

Specific examples of the hydrophilic organic compound include poly(oxyalkylene) monoalkyl ether or monohydroxy polyester, monohydroxy alkyl sulfonate, dialkylamino alcohol, hydroxy carboxylic acid alkyl ester, and dialkylaminoalkyl amine, more specifically the compounds represented by the following formulae (a1) to (e).

[1] A polyalkylene oxide end-capped with an alkoxy group or a phenoxy group, represented by the formula (a1):

wherein $R^1$ represents an alkyl group having 1 to 4 carbon atoms or a phenyl group; $R^2$ represents a hydrogen atom or a methyl group; and m is an integer of 7 to 30.

Examples of the alkyl group having 1 to 4 carbon atoms include a methyl group, an ethyl group, a propyl group, an isopropyl group, n-butyl group, a s-butyl group, an isobutyl group and t-butyl group.

The R$^1$ is preferably a methyl group, and R$^2$ is preferably a hydrogen atom.

The m is an integer of 7 to 30, and in view of enhancing the compatibility of the polycarbodiimide (A) with an aqueous medium, preferably an integer of 7 to 25, and more preferably an integer of 8 to 20.

[2] An alkylene glycol end-capped with an alkoxy group or a phenoxy group, represented by the formula (a2):

$$R^1\text{—}O\text{—}(CH_2\text{—}CHR^2\text{—}O)_m\text{—}H \quad (a2)$$

wherein R$^1$ and R$^2$ have the same meaning as the R$^1$ and R$^2$ in the formula (a1); and m is an integer of 1 to 6.

The R$^1$ is preferably a methyl group, and R$^2$ is preferably a hydrogen atom.

[3] An alkylsulfonate represented by the formula (b):

$$HO\text{—}R^3\text{—}SO_3M \quad (b)$$

wherein R$^3$ represents an alkylene group having 1 to 10 carbon atoms; and M represents an alkali metal such as Na and K.

Examples of the alkylene group having 1 to 10 carbon atoms include a methylene group, an ethylene group, a propylene group, a tetramethylene group, a pentamethylene group, a hexamethylene group, a heptamethylene group, an octamethylene group, a nonamethylene group and a decamethylene group.

[4] A dialkylamino alcohol represented by the formula (c):

$$(R^4)_2\text{—}N\text{—}CH_2\text{—}CHR^5\text{—}OH \quad (c)$$

wherein R$^4$ represents an alkyl group having 1 to 4 carbon atoms; and R$^5$ represents a hydrogen atom or an alkyl group having 1 to 4 carbon atoms. The alkyl group having 1 to 4 carbon atoms have the same meaning as described above.

[5] A hydroxycarboxylic acid alkyl ester represented by the formula (d):

$$R^6\text{—}O\text{—}CO\text{—}CHR^7\text{—}OH \quad (d)$$

wherein R$^6$ represents an alkyl group having 1 to 3 carbon atoms; and R$^7$ represents a hydrogen atom or an alkyl group having 1 to 3 carbon atoms.

Examples of the alkyl group having 1 to 3 carbon atoms include a methyl group, an ethyl group, a propyl group and an isopropyl group.

[6] A dialkylaminoalkyl amine represented by the formula (e):

$$(R^8)_2\text{—}N\text{—}R^9\text{—}NH_2 \quad (e)$$

wherein R$^8$ represents an alkyl group having 1 to 4 carbon atoms; and R$^9$ represents an alkylene group having 1 to 4 carbon atoms. The alkyl group having 1 to 4 carbon atoms have the same meaning as described above.

Examples of the alkylene group having 1 to 4 carbon atoms include a methylene group, an ethylene group, a propylene group and a tetramethylene group.

Among them, the hydrophilic organic compound is preferably the polyalkylene oxide represented by the formula (a1) in view of enhancing the compatibility of the polycarbodiimide (A) with an aqueous medium.

The hydrophilic organic compound used in combination with the polyalkylene oxide represented by the formula (a1) is preferably an alkylene glycol end-capped with an alkoxy group or a phenoxy group, represented by the formula (a2); a dialkylamino alcohol represented by the formula (c); and a hydroxycarboxylic acid alkyl ester represented by the formula (d).

Specific examples of the polyalkylene oxide represented by the formula (a1) include polyethylene glycol monomethyl ether, polyethylene glycol monoethyl ether, polypropylene glycol monomethyl ether, polypropylene glycol monoethyl ether, and polypropylene glycol monophenyl ether. Polyethylene glycol monomethyl ether is particularly preferred.

Specific examples of the dialkylamino alcohol represented by the formula (c) include N,N-dimethylisopropanolamine and N,N-diethylisopropanolamine.

Examples of the hydroxycarboxylic acid alkyl ester represented by the formula (d) include methyl glycolate and methyl lactate.

The polycarbodiimide (A) has substituents derived from the hydrophilic organic compounds at both terminals thereof, but at least one of the substituents is a substituent derived from a hydrophilic organic compound having a molecular weight of 340 or more. When at least one of the substituents at both terminals is a substituent derived from the hydrophilic organic compound having a molecular weight of 340 or more, the compatibility of the polycarbodiimide (A) with an aqueous medium is enhanced. In the present invention, each of the substituents at both terminals is preferably a substituent derived from the hydrophilic organic compound having a molecular weight of 340 or more in view of enhancing the compatibility of the polycarbodiimide (A) with an aqueous medium.

The molecular weight of the hydrophilic organic compounds constituting the substituents at both terminals of polycarbodiimide (A) is preferably 350 or more and more preferably 400 or more in view of enhancing the compatibility of the polycarbodiimide (A) with an aqueous medium, and preferably 3200 or less in terms of maintaining the hydrophilicity. The hydrophilic organic compound having a molecular weight of 340 or more is preferably polyalkylene oxide end-capped with an alkoxy group or a phenoxy group, represented by the formula (a1).

Method of Producing Polycarbodiimide (A)

The polycarbodiimide (A) can be obtained, for example, by synthesizing an isocyanate-terminated polycarbodiimide and then reacting the isocyanate-terminated polycarbodiimide with the hydrophilic organic compound.

Examples of the method of synthesizing the isocyanate-terminated polycarbodiimide include a method of producing an isocyanate-terminated polycarbodiimide by condensation involving the elimination of carbon dioxide from the organic diisocyanate compound (see, for example, U.S. Pat. No. 2,941,956 B; JP 47-33279 B; J. Org. Chem., 28, 2069-2075 (1963); Chemical Review 1981, Vol. 81, No. 4, p 619-621).

Examples of the organic diisocyanate compound used in the production of the isocyanate-terminated polycarbodiimide include an aromatic diisocyanate compound, an aliphatic diisocyanate compound, an alicyclic diisocyanate compound and a heterocyclic diisocyanate compound.

Specific examples of such an organic diisocyanate compound include 1,5-naphthylene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methylcyclohexane diisocyanate, tetramethylxylylene diisocyanate, and 2,5(2,6)-bis(isocyanatomethyl)bicyclo[2.2.1]heptane.

In terms of availability and enhancement of the storage stability, among them, dicyclohexylmethane-4,4'-diisocyanate, tetramethylxylylene diisocyanate are preferred, and dicyclohexylmethane-4,4'-diisocyanate is more preferred.

The decarboxylative condensation reaction of the organic diisocyanate compound is preferably performed in the presence of a carbodiimidization catalyst. Examples of the carbodiimidization catalyst include phospholene oxides such as 1-phenyl-2-phospholene-1-oxide, 3-methyl-1-phenyl-2-phospholene-1-oxide, 1-ethyl-2-phospholene-1-oxide, 3-methyl-2-phospholene-1-oxide and the 3-phospholene isomers thereof. Among them, 3-methyl-1-phenyl-2-phospholene-1-oxide is preferred in terms of the reactivity.

The amount of the carbodiimidization catalyst used in the method of producing the isocyanate-terminated polycarbodiimide is usually from 0.01 to 2.0 parts by mass, relative to 100 parts by mass of the organic diisocyanate compound used in the carbodiimidization.

The decarboxylative condensation reaction of the organic diisocyanate compound may be performed in the absence or presence of a solvent. Examples of the solvent that can be used include alicyclic ethers such as tetrahydrofuran, 1,3-dioxane and dioxolane; aromatic hydrocarbons such as benzene, toluene, xylene and ethylbenzene; halogenated hydrocarbons such as chlorobenzene, dichlorobenzene, trichlorobenzene, perclene, trichloroethane and dichloroethane; and cyclohexanone. The solvent may be used alone or in combination of two or more thereof.

When the reaction is performed in the solvent, the concentration of the organic diisocyanate compound is preferably from 5 to 55% by mass, and more preferably from 5 to 20% by mass.

The conditions of the decarboxylative condensation reaction are not particularly limited, but are preferably from 40 to 250° C., more preferably from 80 to 195° C., preferably for 1 to 30 hours, more preferably for 5 to 25 hours. When the reaction is performed in the solvent, the temperature is preferably from 40° C. to the boiling point of the solvent.

The polycarbodiimide (A) can be obtained by reacting the isocyanate-terminated polycarbodiimide obtained by the above-mentioned method with the above-mentioned hydrophilic organic compound.

The reaction of the isocyanate-terminated polycarbodiimide with the hydrophilic organic compound may be performed by heating the isocyanate-terminated polycarbodiimide preferably to 50 to 200° C., more preferably to 100 to 180° C., then adding the hydrophilic organic compound thereto, and further allowing the reaction to proceed at about 80 to 200° C. for about 0.5 to 5 hours.

The polymerization degree of the polycarbodiimide (A) is not particularly limited, but is preferably from 2 to 20 and more preferably from 3 to 15 in terms of preventing the polycarbodiimide from gelling in an aqueous medium.

Polycarbodiimide (B)

The polycarbodiimide (B) is a polycarbodiimide having substituents derived from organic compounds having a molecular weight of 300 or less at both terminals thereof.

The polycarbodiimide (B) in the present invention can be obtained by reacting the isocyanate-terminated polycarbodiimide with the organic compound, having a molecular weight of 300 or less, reactive with the isocyanate, or by adding a monoisocyanate having a molecular weight of 300 or less during the synthesis of the isocyanate-terminated polycarbodiimide in the presence of the carbodiimidization catalyst to react the monoisocyanate with the isocyanate terminals of the isocyanate-terminated polycarbodiimide.

Organic Compound Having Molecular Weight of 300 or Less

The organic compounds constituting the terminal substituents of the polycarbodiimide (B) must have a molecular weight of 300 or less. Examples of the organic compound include a compound of a molecular weight of 300 or less having an active hydrogen reactive with an isocyanate group or a compound of a molecular weight of 300 or less having an isocyanate group. Specific examples of the organic compound include monoalcohols, monocarboxylic acids, monoamines and monoisocyanates that have one substituent selected from the group consisting of a hydroxyl group, a carboxyl group, an amino group and an isocyanate group.

Examples of such monoalcohols, monocarboxylic acids, monoamines and monoisocyanates include:

monoalcohols having an aliphatic hydrocarbon group, an alicyclic hydrocarbon group or an aromatic hydrocarbon group having 1 to 18 carbon atoms;

polyalkylene glycol monoethers in which one terminal of a polyalkylene glycol having a polymerization degree of 2 to 6 is an ether of an aliphatic hydrocarbon group, an alicyclic hydrocarbon group and an aromatic hydrocarbon group having 1 to 12 carbon atoms;

polyalkylene glycol monoesters that are esters of one terminal of a polyalkylene glycol having a polymerization degree of 2 to 6 and an aliphatic monocarboxylic acid, an alicyclic monocarboxylic acid and an aromatic monocarboxylic acid having 1 to 12 carbon atoms;

monocarboxylic acids having an aliphatic hydrocarbon group, an alicyclic hydrocarbon group or an aromatic hydrocarbon group having 1 to 18 carbon atoms;

monoamines having an aliphatic hydrocarbon group, an alicyclic hydrocarbon group or an aromatic hydrocarbon group having 1 to 18 carbon atoms; and monoisocyanates having an aliphatic hydrocarbon group, an alicyclic hydrocarbon group or an aromatic hydrocarbon group having 1 to 18 carbon atoms.

In the present invention, among these organic compounds, the following organic compounds of a molecular weight of 300 or less having no hydrophilic group in any moieties other than the functional group reactive with the isocyanate group are preferably used in terms of forming stronger micelles in a medium:

a monoalcohol having an aliphatic hydrocarbon group having 1 to 18 carbon atoms, an alicyclic hydrocarbon group having 3 to 18 carbon atoms or an aromatic hydrocarbon group having 6 to 18 carbon atoms;

a monocarboxylic acid having an aliphatic hydrocarbon group having 1 to 18 carbon atoms, an alicyclic hydrocarbon group having 3 to 18 carbon atoms or an aromatic hydrocarbon group having 6 to 18 carbon atoms a monoamine having an aliphatic hydrocarbon group having 1 to 18 carbon atoms, an alicyclic hydrocarbon group having 3 to 18 carbon atoms or an aromatic hydrocarbon group having 6 to 18 carbon atoms; and a monoisocyanate having an aliphatic hydrocarbon group having 1 to 18 carbon atoms, an alicyclic hydrocarbon group having 3 to 18 carbon atoms or an aromatic hydrocarbon group having 6 to 18 carbon atoms.

Examples of the aliphatic hydrocarbon group having 1 to 18 carbon atoms include various butyl groups, various pentyl groups, various hexyl groups, various heptyl groups and various octyl groups. The term "various" used herein refers to various isomers including n-, sec-, tert- and iso-.

Examples of the alicyclic hydrocarbon group having 3 to 18 carbon atoms include a cyclopentyl group, a cyclohexyl group and a cyclooctyl group.

Examples of the aromatic hydrocarbon group having 6 to 18 carbon atoms include a phenyl group, a methylphenyl group, an ethylphenyl group, a propylphenyl group and a naphthyl group.

Furthermore, as the organic compounds constituting the terminal substituents of the polycarbodiimide (B), the hydrophilic organic compounds of a molecular weight of 300 or less represented by the above formulae (a2) to (e) may be used. Among these hydrophilic organic compounds, the polyalkylene oxide end-capped with an alkoxy group or a phenoxy group, represented by the formula (a2) the dialkylamino alcohol represented by the formula (c): and the hydroxycarboxylic acid alkyl ester represented by the formula (d) are more preferred.

Among them, the organic compound of a molecular weight of 300 or less used as a terminal substituent of the polycarbodiimide (B) is preferably one or more selected from the group consisting of a monoalcohol having an aliphatic hydrocarbon group having 1 to 18 carbon atoms, an alicyclic hydrocarbon group having 3 to 18 carbon atoms or an aromatic hydrocarbon group having 6 to 18 carbon atoms; a monoamine having an aliphatic hydrocarbon group having 1 to 18 carbon atoms, an alicyclic hydrocarbon group having 3 to 18 carbon atoms or an aromatic hydrocarbon group having 6 to 18 carbon atoms; a monoisocyanate having an aliphatic hydrocarbon group having 1 to 18 carbon atoms, an alicyclic hydrocarbon group having 3 to 18 carbon atoms or an aromatic hydrocarbon group having 6 to 18 carbon atoms; a polyalkylene oxide end-capped with an alkoxy group or a phenoxy group, represented by the formula (a2); a dialkylamino alcohol represented by the formula (c); and a hydroxycarboxylic acid alkyl ester represented by the formula (d); is more preferably one or more selected from the group consisting of a monoamine having an aliphatic hydrocarbon group having 1 to 18 carbon atoms, an alicyclic hydrocarbon group having 3 to 18 carbon atoms or an aromatic hydrocarbon group having 6 to 18 carbon atoms; and a monoisocyanate having an aliphatic hydrocarbon group having 1 to 18 carbon atoms, an alicyclic hydrocarbon group having 3 to 18 carbon atoms or an aromatic hydrocarbon group having 6 to 18 carbon atoms; is further preferably one or more selected from the group consisting of a monoamine having an aliphatic hydrocarbon group having 1 to 18 carbon atoms or an alicyclic hydrocarbon group having 3 to 18 carbon atoms; and a monoisocyanate having an aliphatic hydrocarbon group having 1 to 18 carbon atoms or an alicyclic hydrocarbon group having 3 to 18 carbon atoms; and is most preferably one or more selected from the group consisting of cyclohexyl isocyanate and cyclohexylamine.

The organic compound may be used alone or in combination of two or more thereof.

The polycarbodiimide (B) may be an organic compound having the same or different substituents at the both terminals. In this context, it is preferred that at least one of the substituents at the both terminals is cyclohexyl isocyanate or cyclohexylamine, and it is more preferred that both substituents at the both terminals are one or more selected from the group consisting of cyclohexyl isocyanate and cyclohexylamine.

Method of Producing Polycarbodiimide (B)

The first method of producing a polycarbodiimide (B) is performed by synthesizing an isocyanate-terminated polycarbodiimide and then reacting the isocyanate-terminated polycarbodiimide with an organic compound of a molecular weight of 300 or less having an active hydrogen reactive with an isocyanate group to obtain the polycarbodiimide (B).

Examples of the method of synthesizing the isocyanate-terminated polycarbodiimide include, as is the case in the above-mentioned polycarbodiimide (A), a method of producing an isocyanate-terminated polycarbodiimide in the presence of a carbodiimidization catalyst by condensation involving the elimination of carbon dioxide from the organic diisocyanate compound such as dicyclohexylmethane-4,4'-diisocyanate (see, for example, U.S. Pat. No. 2,941,956 B; JP 47-33279 B; J. Org. Chem., 28, 2069-2075 (1963); Chemical Review 1981, Vol. 81, No. 4, p 619-621).

The amount of the carbodiimidization catalyst used in the method of producing the isocyanate-terminated polycarbodiimide is usually from 0.01 to 2.0 parts by mass, relative to 100 parts by mass of the organic diisocyanate compound used in the carbodiimidization.

The decarboxylative condensation reaction of the organic diisocyanate compound may be performed in the absence or presence of a solvent. The solvent that can be used is the same as the solvent that can be used in the production of the polycarbodiimide (A).

The conditions of the decarboxylative condensation reaction vary depending on the polymerization degree, the starting material used and the like and are thus not particularly limited, but are preferably from 40 to 200° C., more preferably from 80 to 195° C., preferably for 10 to 70 hours, more preferably for 20 to 60 hours. When the reaction is performed in the solvent, the temperature is preferably from 40° C. to the boiling point of the solvent.

The polycarbodiimide (B) can be obtained by reacting the isocyanate-terminated polycarbodiimide obtained by the above-mentioned method with the above-mentioned organic compound having a molecular weight of 300 or less other than the isocyanate compound. The reaction conditions in this case are the same as in the production of the carbodiimide (A). The polycarbodiimide (B) can be obtained by heating the isocyanate-terminated polycarbodiimide preferably to 50 to 200° C., more preferably to 100 to 180° C., then adding thereto the organic compound other than the isocyanate compound, and further allowing the reaction to proceed at about 80 to 200° C. for about 0.5 to 5 hours.

The polymerization degree of the polycarbodiimide (B) is not particularly limited, but is preferably from 2 to 25, more preferably from 3 to 20 in terms of preventing the polycarbodiimide (B) from gelling in an aqueous medium and in terms of maintaining sufficient storage stability.

The second method of producing a polycarbodiimide (B) is performed by adding a monoisocyanate having a molecular weight of 300 or less together with an organic diisocyanate compound such as dicyclohexylmethane-4,4'-diisocyanate, during the synthesis of an isocyanate-terminated polycarbodiimide in the presence of a carbodiimidization catalyst, to subject them to a decarboxylation condensation reaction to obtain a polycarbodiimide (B).

In this case, the amount of the carbodiimidization catalyst used may be in the same range as that in the above-mentioned first production method. The polycarbodiimide (B) can be obtained by heating the organic diisocyanate compound and the monoisocyanate compound in the presence of the carbodiimidization catalyst, preferably to 40 to 200° C., more preferably to 80 to 195° C. and mixing them for about 10 to 70 hours.

Mass Ratio of Polycarbodiimide (B) to Polycarbodiimide (A)

The mass ratio [(B)/(A)] of the polycarbodiimide (B) to the polycarbodiimide (A) is from 20/80 to 95/5. When the mass ratio [(B)/(A)] is within the above-mentioned range, it is possible to form an emulsion in which the carbodiimide group of the polycarbodiimide (B) is protected by the polycarbodiimide (A). Therefore, the carbodiimide group of the polycarbodiimide (B) is difficult to react the reactive group such as the carboxyl group of the resin and the aqueous medium such as water and as a result, the storage stability of the carbodiimide-based aqueous resin crosslinking agent in the coexistence of the aqueous resin is enhanced.

In terms of the storage stability, the mass ratio [(B)/(A)] is from 20/80 to 95/5, preferably from 25/75 to 90/10, more preferably from 30/70 to 75/25, further preferably from 35/65 to 70/30, and still further preferably from 35/65 to 65/35.

Carbodiimide-Based Aqueous Resin Crosslinking Agent-Containing Liquid and Production Method Thereof The carbodiimide-based aqueous resin crosslinking agent of the present invention can be obtained by mixing the polycarbodiimide (A) and the polycarbodiimide (B) in such amounts to satisfy the above-mentioned mass ratio, but in view of later use, it is preferably prepared as the carbodiimide-based aqueous resin crosslinking agent-containing liquid of the present invention comprising the carbodiimide-based aqueous resin crosslinking agent and an aqueous medium.

The carbodiimide-based aqueous resin crosslinking agent-containing liquid of the present invention can be produced by mixing the carbodiimide-based aqueous resin crosslinking agent of the present invention and an aqueous medium. Examples of the production method include the following [1] to [3]:

[1] A method comprising mixing the polycarbodiimide (A), the polycarbodiimide (B) and an aqueous medium simultaneously.

[2] A method comprising previously preparing a mixture of the polycarbodiimide (A) and an aqueous medium and a mixture of the polycarbodiimide (B) and an organic solvent, respectively, mixing them and removing the organic solvent by heating or like.

The organic solvent that can be used in the method [2] is not particularly limited, so long as it can dissolve the polycarbodiimide (B). Specific examples of the organic solvent include methanol, ethanol, isopropyl alcohol, hexane, cyclohexanone, methyl ethyl ketone, acetone, N-methylpyrrolidone, toluene, diethyl ether, tetrahydrofuran (THF) and a mixed solvent thereof.

[3] A method comprising a step of mixing the polycarbodiimide (A) and the polycarbodiimide (B) to prepare a mixed liquid and a step of mixing the mixed liquid and the aqueous medium.

In the present invention, in terms of enhancing the dispersibility of the polycarbodiimide (B), the carbodiimide-based aqueous resin crosslinking agent-containing liquid is preferably produced by the method [3].

In terms of enhancing the dispersibility of the polycarbodiimide (B), the total content of the polycarbodiimide (A) and the polycarbodiimide (B) in the carbodiimide-based aqueous resin crosslinking agent-containing liquid of the present invention is preferably from 5 to 220 parts by mass, more preferably from 5 to 150 parts by mass, further preferably from 5 to 90 parts by mass, even more preferably from 10 to 80 parts by mass, and still more preferably from 15 to 75 parts by mass, each relative to 100 parts of the aqueous medium.

Aqueous Medium

Examples of the aqueous medium that can be used in the present invention include water and a mixture solvent of water and the other solvent. The other solvent is not particularly limited, so long as it is compatible with water. Examples of the other solvent include alcohols, ethers, ketones and esters.

Specific examples of the alcohols include methyl alcohol, n-butyl alcohol, isopropyl alcohol, 2-ethylhexyl alcohol, ethylene glycol, propylene glycol and 2-(2-n-butoxyethoxy) ethanol.

Examples of the ethers include ethylene glycol monoethyl ether, ethylene glycol monobutyl ether, ethylene glycol monohexyl ether, propylene glycol monoethyl ether, 3-methyl-3-methoxybutanol, diethylene glycol monoethyl ether and diethylene glycol monobutyl ether.

Examples of the ketones include methyl isobutyl ketone, cyclohexanone, isophorone and acetylacetone.

Examples of esters include ethylene glycol monoethyl ether acetate and ethylene glycol monobutyl ether acetate.

The aqueous medium may be used alone or in combination of two or more thereof.

From an environmental point of view, the aqueous medium is preferably a fully water-based system consisting of only water.

Mixing Conditions

The temperature at which the polycarbodiimide (A) and the polycarbodiimide (B) are mixed varies depending on the type of the carbodiimide resin and the polymerization degree and is thus not particularly limited, but is preferably from 80 to 200° C. and more preferably from 90 to 180° C. The mixing time is preferably from 1 to 8 hours and more preferably from 2 to 6 hours.

The temperature at which the mixture of the polycarbodiimide (A) and the polycarbodiimide (B) is mixed with the aqueous medium varies depending on the type of the carbodiimide resin and the polymerization degree and thus is not particularly limited, but is preferably from 50 to 100° C. and more preferably from 60 to 90° C. The mixing time is preferably from 30 minutes to 4 hours and more preferably from 1 to 3 hours.

Examples of the mixing method include a method comprising stirring with a blade of a suitable shape which is mechanically rotated by a stirring motor, and a method comprising stirring by using a magnetic stirrer with a magnetic stirrer rotor.

Surfactant

The carbodiimide-based aqueous resin crosslinking agent-containing liquid of the present invention can contain a surfactant to further enhance the storage stability of the carbodiimide-based aqueous resin crosslinking agent in an aqueous medium and the storage stability of the carbodiimide-based aqueous resin crosslinking agent in the coexistence of an aqueous resin.

Examples of the surfactant include a nonionic surfactant, an anionic surfactant and a cationic surfactant. In terms of enhancing the storage stability of the carbodiimide-based aqueous resin crosslinking agent in the coexistence of an aqueous resin, a nonionic surfactant and an anionic surfactant are preferred, and an anionic surfactant is more preferred.

Specific examples of the anionic surfactant include sodium dodecylbenzenesulfonate, sodium dodecylsulfate, sodium lauryl ether sulfate, and dipotassium alkenylsuccinate. Sodium dodecylbenzenesulfonate is preferred.

When the surfactant is used, the amount used is preferably 0.1 parts by mass or more and more preferably 0.3 parts by mass or more, and preferably 5 parts by mass or less and more preferably 4 parts by mass or less, each relative to 100 parts of the total amount of the polycarbodiimide (A) and the polycarbodiimide (B). When the amount of the surfactant used is within the above range, it is possible to enhance the storage stability while keeping down the production cost.

Aqueous Resin Composition

The aqueous resin composition of the present invention contains the carbodiimide-based aqueous resin crosslinking agent of the present invention and an aqueous resin. The aqueous resin composition of the present invention contains the carbodiimide-based aqueous resin crosslinking agent of the present invention excellent in the storage stability in the coexistence of the aqueous resin, and can therefore perform the crosslinking reaction by heating or the like, even after a long period of time that has elapsed since the aqueous resin composition was produced.

Aqueous Resin

The aqueous resin suitable for the aqueous resin composition of the present invention is not particularly limited, so long as it is water soluble or water dispersible and is a resin crosslinking-reactive with a carbodiimide group.

Specific examples of the aqueous resin include an urethane resin, an acrylic resin and a polyester resin that have a carboxyl group within the molecule and is water soluble or water dispersible. Among them, a urethane resin and an acrylic resin are preferred. The aqueous resin may be used alone or in combination of two or more thereof.

Content of Carbodiimide-Based Aqueous Resin Crosslinking Agent in Aqueous Resin Composition In terms of the balance of the properties of the resulting coating film and economics, the content of the carbodiimide-based aqueous resin crosslinking agent in the aqueous resin composition is preferably from 0.5 to 40 parts by mass, more preferably from 1 to 30 parts by mass, further preferably from 1.5 to 20 parts by mass, each relative to 100 parts of the aqueous resin.

Optional Components

The aqueous resin composition of the present invention can contain various additive components appropriately depending on the intended use and if necessary, such as a pigment, a filler, a leveling agent, a dispersant, a plasticizer, an ultraviolet absorber and an antioxidant.

Method of Producing Aqueous Resin Composition

The method of producing the aqueous resin composition of the present invention is not particularly limited, and can be produced by mixing each of the components in a known manner in the art. The aqueous resin composition of the present invention may be produced by mixing the carbodiimide-based aqueous resin crosslinking agent of the present invention and an aqueous resin, or may be produced by mixing the carbodiimide-based aqueous resin crosslinking agent-containing liquid of the present invention and an aqueous resin.

Method of Using Aqueous Resin Composition

The aqueous resin composition of the present invention can be applied on a given substrate to form a coating layer, resulting in a coating film.

In this case, any method conventionally known in the art can be employed as the coating method. For example, brush coating, tampon coating, spray coating, hot spray coating, airless spray coating, roller coating, curtain flow coating, flow coating, dip coating, knife edge coating and the like may be employed. After forming the coating layer, it may be subjected to heating for accelerating a crosslinking reaction. The heating method is not particularly limited, and for example, a method using an electric heating furnace, an infrared ray heating furnace, a high-frequency heating furnace or the like may be employed.

Example

The polycarbodiimides used in Examples and Comparative Examples were synthesized according the following procedures.

Synthesis of Polycarbodiimide (A)

Synthesis Example 1

100 Parts by mass of dicyclohexylmethane-4,4'-diisocyanate and 0.5 parts by mass of a carbodiimidization catalyst (3-methyl-1-phenyl-2-phospholene-1-oxide) were placed in a reaction vessel equipped with a reflux condenser and a stirrer, and stirred under a nitrogen stream at 190° C. for 17 hours to provide an isocyanate-terminated dicyclohexylmethane polycarbodiimide.

The absorption peak derived from the carbodiimide group around a wavelength of 2,150 cm$^{-1}$ was confirmed by infrared (IR) spectroscopy. The NCO % was determined to be 5.34% (polymerization degree=6.0).

Then, the resulting isocyanate-terminated dicyclohexylmethane polycarbodiimide was heated to 150° C. and 54.5 parts by mass of polyethylene glycol monomethyl ether (molecular weight: 500; hereinafter also referred to as "MPEG 500") was added thereto, and the mixture was heated to 180° C. and reacted for 2 hours with stirring.

Disappearance of the absorption derived from the isocyanate group at a wavelength of from 2,200 to 2,300 cm$^{-1}$ was confirmed by infrared (IR) spectroscopy. The mixture was removed from the reaction vessel and cooled to room temperature to provide a polycarbodiimide as a pale yellow transparent liquid.

Synthesis Examples 2 to 6

The polycarbodiimides were obtained in the same manner as in Synthesis Example 1 except that the polycarbodiimides were produced according to the formulation shown in Table 1. The abbreviations in Table 1 are as follows, and the numbers in parentheses indicate molecular weights.

MPEG (500): polyethylene glycol monomethyl ether; molecular weight: 500
MPEG (400): polyethylene glycol monomethyl ether; molecular weight: 400
MPEG (350): polyethylene glycol monomethyl ether; molecular weight: 350
AA (131): N,N-diethyl isopropanolamine
GM (90): methyl glycolate

TABLE 1

| | | Polycarbodiimide (A) | | | |
|---|---|---|---|---|---|
| | | Terminal (1) | | Terminal (2) | |
| | | Hydrophilic organic compound | Amount used (parts by mass) | Hydrophilic organic compound | Amount used (parts by mass) |
| Synthesis Example | 1 | MPEG (500) | 54.5 | MPEG (500) | *1 |
| | 2 | MPEG (400) | 43.6 | MPEG (400) | *1 |
| | 3 | MPEG (400) | 21.8 | AA (131) | 7.1 |
| | 4 | MPEG (350) | 19.1 | AA (131) | 7.1 |
| | 5 | MPEG (350) | 38.2 | MPEG (350) | *1 |
| | 6 | MPEG (400) | 21.8 | GM (90) | 4.9 |

*1: The amount of the terminal (2) used is included in the amount of the terminal (1) used.

Synthesis of Polycarbodiimide (X)

Synthesis Example 7

The polycarbodiimide was obtained in the same manner as in Synthesis Example 1 except that the polycarbodiimide was produced according to the formulation shown in Table 2. The abbreviations in Table 2 are as follows, and the numbers in parentheses indicate molecular weights.

MPEG (400): polyethylene glycol monomethyl ether; molecular weight: 400

OA (130): octanol

TABLE 2

| | Polycarbodiimide (X) | | | |
|---|---|---|---|---|
| | Terminal (1) | | Terminal (2) | |
| | Organic compound | Amount used (parts by mass) | Organic compound | Amount used (parts by mass) |
| Synthesis Example 7 | MPEG (400) | 21.8 | OA (130) | 7.1 |

Synthesis of Polycarbodiimide (B)

Synthesis Example 8

The polycarbodiimide was obtained in the same manner as in Synthesis Example 1 except that the polycarbodiimide was produced according to the formulation shown in Table 3.

Synthesis Example 9

In order to obtain the polycarbodiimide having a polymerization degree of 4, 100 Parts by mass of dicyclohexylmethane-4,4'-diisocyanate, 19.1 parts by mass of cyclohexyl isocyanate and 1.2 parts by mass of a carbodiimidization catalyst (3-methyl-1-phenyl-2-phospholene-1-oxide) were placed in a reaction vessel equipped with a reflux condenser and a stirrer, and reacted under a nitrogen stream at 180° C. for 56 hours.

Disappearance of the absorption derived from the isocyanate group at a wavelength of from 2,200 to 2,300 $cm^{-1}$ was confirmed by infrared (IR) spectroscopy. The mixture was removed from the reaction vessel and cooled to room temperature to provide a polycarbodiimide as a pale yellow transparent liquid.

Synthesis Example 10

100 Parts by mass of dicyclohexylmethane-4,4'-diisocyanate and 0.5 parts by mass of a carbodiimidization catalyst (3-methyl-1-phenyl-2-phospholene-1-oxide) were placed in a reaction vessel equipped with a reflux condenser and a stirrer, and stirred under a nitrogen stream at 180° C. for 28 hours. The reaction was quenched by cooling to 90° C. to provide an isocyanate-terminated dicyclohexylmethane polycarbodiimide.

The absorption peak derived from the carbodiimide group around a wavelength of 2,150 $cm^{-1}$ was confirmed by infrared (IR) spectroscopy. The NCO % was determined to be 2.35% (polymerization degree=15.2).

Then, the resulting isocyanate-terminated dicyclohexylmethane polycarbodiimide was heated to 160° C. and 4.7 parts by mass of cyclohexylamine (molecular weight: 99.17) was added thereto, and the mixture was heated to 180° C. and reacted for 1.5 hours with stirring.

Disappearance of the absorption derived from the isocyanate group at a wavelength of from 2,200 to 2,300 $cm^{-1}$ was confirmed by infrared (IR) spectroscopy. Thus, a yellow transparent polycarbodiimide was obtained. The obtained polycarbodiimide was cooled ant then ground with a roll granulator.

Synthesis Example 11

100 Parts by mass of dicyclohexylmethane-4,4'-diisocyanate, 6.8 parts by mass of cyclohexyl isocyanate and 1.07 parts by mass of a carbodiimidization catalyst (3-methyl-1-phenyl-2-phospholene-1-oxide) were placed in a reaction vessel equipped with a reflux condenser and a stirrer, and stirred under a nitrogen stream at 180° C. for 56 hours. The reaction was quenched by cooling to 90° C. to provide an isocyanate-terminated dicyclohexylmethane polycarbodiimide having one terminal blocked with a cyclohexyl group.

The absorption peak derived from the carbodiimide group around a wavelength of 2,150 $cm^{-1}$ was confirmed by infrared (IR) spectroscopy. The NCO % was determined to be 2.54% (polymerization degree=6).

Then, the resulting isocyanate-terminated dicyclohexylmethane polycarbodiimide having one terminal blocked with a cyclohexyl group was heated to 160° C. and 7.1 parts by mass of cyclohexylamine (molecular weight: 99.17) was added thereto, and the mixture was heated to 180° C. and reacted for 1.5 hours with stirring.

Disappearance of the absorption derived from the isocyanate group at a wavelength of from 2,200 to 2,300 $cm^{-1}$ was then confirmed by infrared (IR) spectroscopy. The mixture was removed from the reaction vessel and cooled to room temperature to provide a polycarbodiimide as a pale yellow transparent liquid.

Synthesis Examples 12 to 15

The polycarbodiimides were obtained in the same manner as in Synthesis Example 1 except that the polycarbodiimides were produced according to the formulation shown in Table 3. The abbreviations in Table 3 are as follows, and the numbers in parentheses indicate molecular weights.

MPEG (300): polyethylene glycol monomethyl ether; molecular weight: 300

CHI (125): cyclohexyl isocyanate

CHA (99): cyclohexylamine

AA (131): N,N-diethylisopropanolamine

MPEG (252): polyethylene glycol monomethyl ether; molecular weight: 252

GM (90): methyl glycolate

TABLE 3

| | | Polycarbodiimide (B) | | | |
|---|---|---|---|---|---|
| | | Terminal (1) | | Terminal (2) | |
| | | Organic compound | Amount used (parts by mass) | Organic compound | Amount used (parts by mass) |
| Synthetic Example | 8 | MPEG (300) | 16.3 | AA (131) | 7.1 |
| | 9 | CHI (125) | 19.1 | CHI (125) | *1 |
| | 10 | CHA (99) | 4.7 | CHA (99) | *1 |
| | 11 | AA (131) | 7.1 | CHI (125) | 6.8 |
| | 12 | AA (131) | 14.3 | AA (131) | *1 |

TABLE 3-continued

| | Polycarbodiimide (B) | | | |
|---|---|---|---|---|
| | Terminal (1) | | Terminal (2) | |
| | Organic compound | Amount used (parts by mass) | Organic compound | Amount used (parts by mass) |
| 13 | MPEG (252) | 27.5 | MPEG (252) | *1 |
| 14 | MPEG (252) | 13.7 | AA (131) | 7.1 |
| 15 | GM (90) | 9.8 | GM (90) | *1 |

*1: The amount of the terminal (2) used is included in the amount of the terminal (1) used.

Examples 1 to 18 and Comparative Examples 1 to 12

Production of Carbodiimide-Based Aqueous Resin Crosslinking Agent-Containing Liquid (1)

Each polycarbodiimide was blended with the other components according to the description in Table 4, stirred at 150° C. for 4 hours, and then diluted with 150 parts by mass of ion-exchanged water. In Examples 4 and 16 and Comparative Examples 6 and 12, the surfactant was also added thereto. Thus, the carbodiimide-based aqueous resin crosslinking agent-containing liquids of Examples 1 to 4 and 6 to 18 and Comparative Examples 1 to 12 were obtained.

As a surfactant, an aqueous solution of sodium dodecylbenzenesulfonate (active ingredient: 16% by mass) was used. The amount of each surfactant shown in Table 4 represents the amount of the active ingredient in the surfactant.

Production of Carbodiimide-Based Aqueous Resin Crosslinking Agent-Containing Liquid (2)

A solution obtained by mixing 90 parts by mass of the polycarbodiimide (B) and a mixed solvent of THF and methanol (THF/methanol=5/1 (mass ratio)) were added dropwise to an aqueous solution obtained by mixing 10 parts by mass of the polycarbodiimide (A) and 400 parts by mass of ion-exchanged water to provide a milky white emulsion. THF and methanol were distilled off from this emulsion to provide a carbodiimide-based aqueous resin crosslinking agent-containing liquid of Example 5.

Production of Aqueous Resin Composition (1)

Each of the carbodiimide-based aqueous resin crosslinking agent-containing liquids obtained in Examples 1 to 18 and Comparative Examples 1 to 12 was added to 100 parts by mass of a polyurethane resin (Sancure™ 815 commercially available from Lubrizol; an aqueous dispersion having a solid content of 35% by mass) so as to provide 2 parts by mass of the solid content of the carbodiimide-based aqueous resin crosslinking agent to prepare an aqueous resin composition. Thereafter, in order to evaluate the crosslinking performance immediately after the preparation, a test piece was prepared according to the following procedure, and the following rubbing test was performed on the test piece. The results are shown in Table 4.

Procedure for Preparing Test Piece

The aqueous resin composition was cast on an aluminum plate using a bar coater with a wire rod No. 32. Then, the aqueous resin composition was crosslinked by drying it at 120° C. for 10 minutes and allowed to stand at room temperature for 1 day to prepare a test piece.

Rubbing Test

For the aqueous resin composition after 30 days from the preparation, the surface of the test piece was subjected to a double rubbing test with a load of 900 g/cm$^2$ using ER-1B model manufactured by Suga Test Instruments Co., Ltd. as a rubbing tester and ethanol (99.5% by mass) as a solvent. After 10, 25, 50, 75 and 100 times of rubbing, the surface of the coating film was visually observed, and given scores from 0 to 5 points according to the following criteria, respectively. This rubbing test was performed in duplicate. The total score of the points given at each number of rubbing times (full points=5 points×5=25 points) in each test was calculated and the scores of both tests were averaged. The average was used for the evaluation.

Evaluation

5 Points: no change
4 Points: partially whitened thinly or wholly whitened very thinly
3 Points: partially whitened or wholly whitened thinly
2 Points: wholly whitened
1 Point: slightly dissolved
0 Point: dissolved Viscosity Measurement The viscosity of the aqueous resin composition immediately after the preparation and the viscosity of the aqueous resin composition after 30 days from the preparation were measured with a digital viscometer (TVB-10M manufactured by Toki Sangyo Co., Ltd.) under the following conditions. In this test, those having a viscosity change of not more than 10% from immediately after the preparation were evaluated as acceptable (G: excellent in storage stability) and those with a viscosity change of 10% or more as unacceptable (F: poor in storage stability).

Temperature: 20° C.
Rotor: M2 rotor
Number of rotations: 60 rpm

TABLE 4

| | | Polycarbodiimide (A) (*2) | | Polycarbodiimide (B) | | Amount blended (parts by mass) | | | | Results | |
|---|---|---|---|---|---|---|---|---|---|---|---|
| | | | | | | Polycarbodiimide | | | Aqueous | Rubbing | |
| | | Terminal (1) | Terminal (2) | Terminal (1) | Terminal (2) | (A) | (B) | Surfactant | medium | test | Viscosity |
| Example | 1 | MPEG (500) | MPEG (500) | CHI (125) | CHI (125) | 70 | 30 | | 150 | 20 | G |
| | 2 | | | | | 40 | 60 | | 150 | 21 | G |
| | 3 | | | | | 30 | 70 | | 150 | 22 | G |
| | 4 | | | | | 40 | 60 | 3 | 150 | 23 | G |
| | 5 | MPEG (400) | MPEG (400) | CHA (99) | CHA (99) | 10 | 90 | | 400 | 23 | G |
| | 6 | | AA (131) | CHI (125) | CHI (125) | 70 | 30 | | 150 | 20 | G |
| | 7 | MPEG (350) | | | | 70 | 30 | | 150 | 20 | G |
| | 8 | | | AA (131) | CHI (125) | 70 | 30 | | 150 | 18 | G |
| | 9 | | MPEG (350) | | AA (131) | 70 | 30 | | 150 | 14 | G |
| | 10 | | | MPEG (252) | MPEG (252) | 70 | 30 | | 150 | 14 | G |

TABLE 4-continued

| | | Polycarbodiimide (A) (*2) | | Polycarbodiimide (B) | | Amount blended (parts by mass) | | | | Results | |
|---|---|---|---|---|---|---|---|---|---|---|---|
| | | Terminal (1) | Terminal (2) | Terminal (1) | Terminal (2) | (A) | (B) | Surfactant | Aqueous medium | Rubbing test | Viscosity |
| | 11 | | AA (131) | AA (131) | AA (131) | 70 | 30 | | 150 | 14 | G |
| | 12 | | | MPEG (252) | | 70 | 30 | | 150 | 14 | G |
| | 13 | MPEG (500) | MPEG (500) | GM (90) | GM (90) | 70 | 30 | | 150 | 14 | G |
| | 14 | | | | | 40 | 60 | | 150 | 15 | G |
| | 15 | | | | | 30 | 70 | | 150 | 15 | G |
| | 16 | | | | | 40 | 60 | 3 | 150 | 15 | G |
| | 17 | MPEG (400) | MPEG (400) | | | 10 | 90 | | 150 | 15 | G |
| | 18 | | GM (90) | | | 70 | 30 | | 150 | 15 | G |
| Comparative Example | 1 | MPEG (500) | MPEG (500) | — | — | 100 | 0 | | 150 | 3 | F |
| | 2 | | | CHI (125) | CHI (125) | 90 | 10 | | 150 | 5 | F |
| | 3 | MPEG (400) | OA (130) | | | 40 | 60 | | 150 | 5 | F |
| | 4 | — | — | | | 0 | 100 | | 150 | * | F |
| | 5 | MPEG (400) | OA (130) | | | 70 | 30 | | 150 | 5 | F |
| | 6 | — | — | | | 0 | 100 | 50 | 150 | * | F |
| | 7 | MPEG (500) | MPEG (500) | | | 1 | 99 | | 150 | * | F |
| | 8 | MPEG (300) | AA (131) | | | 70 | 30 | | 150 | 8 | F |
| | 9 | MPEG (350) | MPEG (350) | — | — | 100 | 0 | | 150 | 3 | F |
| | 10 | | AA (131) | — | — | 100 | 0 | | 150 | 4 | F |
| | 11 | MPEG (500) | MPEG (500) | GM (90) | GM (90) | 90 | 10 | | 150 | 3 | F |
| | 12 | — | — | | | 0 | 100 | 50 | 150 | * | F |

(*2): In Comparative Examples 3 and 5, the polycarbodiimide (X) was used instead of the polycarbodiimide (A).

Examples 19 to 22 and Comparative Examples 13 and 14

Production of Carbodiimide-Based Aqueous Resin Crosslinking Agent-Containing Liquid (3)

The carbodiimide-based aqueous resin crosslinking agent-containing liquid of the Examples 19 to 22 and Comparative Examples 13 and 14 were obtained in the same manner as in the above-mentioned Production of Carbodiimide-based Aqueous Resin Crosslinking Agent-Containing Liquid (1) except that each polycarbodiimide was blended according to the formulation shown in Table 5.

Production of Aqueous Resin Composition (2)

The carbodiimide-based aqueous resin crosslinking agent-containing liquid obtained according to the formulation shown in Table 5 was added to prepare an aqueous resin composition in the same manner as the-above mentioned Production of Aqueous Resin Composition (1), and the same evaluation as the above-mentioned evaluation was performed, except that the polyurethane resin was changed to an acrylic resin (AC261P, manufactured by Dow Corning Toray Co., Ltd.) and the crosslinking conditions at the time of preparing the test piece were changed to 30 minutes at 120° C. The results are given in Table 5.

The results clearly show that according to the present invention, it is possible to provide a carbodiimide-based aqueous resin crosslinking agent excellent in the storage stability in the coexistence of an aqueous resin, and a carbodiimide-based aqueous resin crosslinking agent-containing liquid containing it.

INDUSTRIAL APPLICABILITY

The aqueous resin composition comprising the carbodiimide-based aqueous resin crosslinking agent of the present invention and an aqueous resin can be produced by a simple method, and is excellent in the storage stability in the coexistence of an aqueous resin while keeping excellent performance of the conventional carbodiimide-based aqueous crosslinking agent. Therefore, it can be suitably used as surface treating agents such as paints, inks, fiber treating agents, adhesives, dipping compositions and coating agents.

The invention claimed is:

1. A carbodiimide-based aqueous resin crosslinking agent comprising a polycarbodiimide (A) having substituents derived from hydrophilic organic compounds at both terminals thereof, at least one of the substituents being a substituent derived from a hydrophilic organic compound having a molecular weight of 340 or more, and a polycarbodiimide (B) having substituents derived from organic compounds having a molecular weight of 300 or less at both terminals thereof, wherein the mass ratio [(B)/(A)] of the polycarbodiimide (B) to the polycarbodiimide (A) is from 20/80 to 95/5.

TABLE 5

| | | Polycarbodiimide (A) | | Polycarbodiimide (B) | | Amount blended (parts by mass) | | | | Results | |
|---|---|---|---|---|---|---|---|---|---|---|---|
| | | Terminal (1) | Terminal (2) | Terminal (1) | Terminal (2) | (A) | (B) | Surfactant | Aqueous medium | Rubbing test | Viscosity |
| Example | 19 | MPEG (500) | MPEG (500) | CHI (125) | CHI (125) | 70 | 30 | | 150 | G | G |
| | 20 | | | | | 40 | 60 | | 150 | G | G |
| | 21 | | | | | 40 | 60 | 3 | 150 | G | G |
| | 22 | | | | | 30 | 70 | | 150 | G | G |
| Comparative Example | 13 | MPEG (500) | MPEG (500) | — | — | 100 | 0 | | 150 | F | F |
| | 14 | | | CHI (125) | CHI (125) | 90 | 10 | | 150 | F | F |

2. The carbodiimide-based aqueous resin crosslinking agent according to claim 1, wherein the hydrophilic organic compound having a molecular weight of 340 or more is a polyalkylene oxide end-capped with an alkoxy group or a phenoxy group, represented by the following formula (a1):

     (a1)

wherein $R^1$ represents an alkyl group having 1 to 4 carbon atoms or a phenyl group; $R^2$ represents a hydrogen atom or a methyl group; and m is an integer of 7 to 30.

3. The carbodiimide-based aqueous resin crosslinking agent according to claim 2, wherein $R^1$ is a methyl group and $R^2$ is a hydrogen atom.

4. The carbodiimide-based aqueous resin crosslinking agent according to claim 1, wherein the organic compound having a molecular weight of 300 or less is a compound having an active hydrogen reactive with an isocyanate group or a compound having an isocyanate group.

5. The carbodiimide-based aqueous resin crosslinking agent according to claim 4, wherein the compound having an active hydrogen reactive with an isocyanate group is one or more monoamines having an aliphatic hydrocarbon group having 1 to 18 carbon atoms or an alicyclic hydrocarbon group having 3 to 18 carbon atoms, and the compound having an isocyanate group is one or more monoisocyanates having an aliphatic hydrocarbon group having 1 to 18 carbon atoms or an alicyclic hydrocarbon group having 3 to 18 carbon atoms.

6. The carbodiimide-based aqueous resin crosslinking agent according to claim 4, wherein the compound having an active hydrogen reactive with an isocyanate group is cyclohexylamine, and the compound having an isocyanate group is cyclohexyl isocyanate.

7. A carbodiimide-based aqueous resin crosslinking agent-containing liquid, comprising the carbodiimide-based aqueous resin crosslinking agent according to claim 1 and an aqueous medium.

8. The carbodiimide-based aqueous resin crosslinking agent-containing liquid according to claim 7, further comprising a surfactant.

9. The carbodiimide-based aqueous resin crosslinking agent-containing liquid according to claim 7, wherein the aqueous medium is water.

10. A method of producing the carbodiimide-based aqueous resin crosslinking agent-containing liquid according to claim 7, comprising a step of mixing the polycarbodiimide (A) and the polycarbodiimide (B) to prepare a mixed liquid; and a step of mixing the mixed liquid and the aqueous medium.

11. An aqueous resin composition comprising the carbodiimide-based aqueous resin crosslinking agent according to claim 1 and an aqueous resin.

* * * * *